United States Patent Office 2,995,030
Patented Aug. 8, 1961

2,995,030
DETERMINATION OF THE PERCENTAGE BY WEIGHT SOLIDS IN A SLURRY
David A. Feigley, Jr., Manor Township, Lancaster County, Pa., assignor to Armstrong Cork Company, Lancaster, Pa., a corporation of Pennsylvania
No Drawing. Filed Mar. 15, 1957, Ser. No. 646,197
4 Claims. (Cl. 73—61)

This invention relates to a method of determing the percentage by weight solids in a solids-in-liquid slurry.

In the past, the determination of the solids content of a solids-in-liquids slurry has generally involved some type of filtration followed by a weighing operation to determine the weight of the solids in a given weight of the slurry. The method is time-consuming. In the paper industry in particular, work has been done to find a short-cut method for determining the percent by weight fibers in a fibers-in-water slurry. All these methods involve some type of filtration, but they avoid the more lengthy drying operation of the fibers by assuming either the residual moisture content, or the residual volume, of the resulting fiber pad to be constant after standard pressing conditions. These assumptions appear to be valid only when the type of pulp and the degre of mechanical refining also remain constant. But there still remains the need for a quick, accurate, and simple method for determining the solids content of slurries.

It is the primary object of the present invention to supply such a need. It is another object of the present invention to present a method for determining the solids content of slurries by means of a wet-weighing method which eliminates the need for a drying or pressing operation.

The invention contemplates weighing a deaerated representative sample of the slurry. The wet weight of the solids is then determined; that is, the weight of the solids is measured while the solids are immersed in deaerated liquid which is identical with the liquid phase of the solids-in-liquid slurry. These two weighings, plus a knowledge of the specific gravity of the solids, enable one to determine the solids content of the slurry in a simple manner.

These results are arrived at by a reversal of the Archimedes method of measuring specific gravity. The theory of the present invention is most easily presented in the form of simple equations.

From the definition of specific gravity:

$$\text{Specific gravity} = \frac{\text{weight of solid}}{\text{weight of equal volume water}}$$

$$= \frac{\text{weight of solid in air}}{\text{weight of solid in air} - \text{weight of solid in water}}$$

Using symbols, the above equation can be expressed as (1) $$S = \frac{A}{A-W}$$

wherein S is the specific gravity of the solid, A is the weight of the solid in air, and W is the weight of the same solid in water.

Simple algebraic rearrangement gives (2) $$A = \frac{S}{S-1} \times W$$

The solids content of any slurry in percentage by weight is given by $$\text{Percentage by weight solids} = \frac{\text{Weight of solids in air}}{\text{Total weight of slurry}}$$

Using the terminology employed above, we have (3) $$\text{Percent solids} = \frac{A}{T}$$

wherein T is the total weight of the slurry. Substituting now the derived value for A from Equation (2) into Equation (3) we get (4) $$\text{Percent solids} = \frac{\frac{S}{S-1} \times W}{T} \times 100$$

Equation 4 will yield the percentage solids content of all slurries wherein the liquid phase has a specific gravity of 1. Where the liquid phase is a material having a specific gravity other than 1, then Equation 4 will be modified by the specific gravity of the liquid so that the equation appears.

(5) $$\text{Percent solids} = \frac{\frac{S}{S-1} \times W}{T} \times 100 \times L$$

wherein L is the specific gravity of the liquid in the solids-in-liquid slurry. It can be seen that this equation also holds true for water, since with water, L equals one.

The specific gravity of the particular solid under consideration will generally be found by reference to the literature. This will be true even where the solid is papermaking fibers. Specific gravities cited in the technical literature are normally related back to water at 4° C. In addition, a number of different methods have been used to make the determinations, usually leading to slightly different values. In order to gain greater accuracy, particularly where dealing with papermaking slurries, it is often desirable to determine the specific gravity of the fibers under ambient conditions rather than rely on standard specific gravities. Such a determination will cancel out the error-producing effects of temperature and any dissolved salts or other materials in the liquid phase of the slurry. For example, the specific gravity of cellulose fibers will be found in the technical literature to be about 1.54. But a specific gravity determination of cellulose fibers made in white water at room temperature (about 23° C.) produces a specific gravity of 1.61. Use of this latter specific gravity simplifies the determination and gives more accurate results.

Where the consistency of a papermaking slurry is sought, care must be taken during the determination of the wet weight of the fibers. Tiny air bubbles are attached to the fibers, buoying them up and thus giving false wet weights. To obtain consistent and accurate results by the method of the present invention, it is necessary that the slurry samples be deaerated. Additionally, it is preferred that the water in which the fibers are weighed also be deaerated. Dearation of the weighed slurry sample may readily be accomplished by, for example, a two-minute exposure to vacuum (.2–.3 mm. Hg) supplied by a typical oil sealed vacuum pump. However, deaeration of the water in which the fibers are to be weighed by means of a vacuum pump is more difficult. This is true because the water in which the fibers are to be weighed is usually in a larger container, for example, a 1–5 gallon bucket, which does not readily lend itself to exposure to vacuum (in the laboratory). Dissolved gases in such water may be readily scavenged by the addition of a small amount of ethyl ether, followed by agitation. Instead of ethyl ether any scavenging agent which will drive dissolved gases out of the liquid may be used. The ethyl ether may also be used to deaerate the weighed slurry sample and thus obviate the need for subjecting it to a vacuum. Alternatively, combinations of a scavenging agent and vacuum may be used on both the weighed slurry sample and the liquid in which the solids are to be weighed to determine the wet weight of the solids.

It is apparent that the liquid in which the solids are weighed must have a specific gravity substantially identical to that of the liquid in the solids-in-liquid slurry. Minor variations in the two specific gravities will produce minor errors which can be tolerated to the extent of the need for accuracy in the solids-content determination. The simplest way to obtain the liquid in which the solids are to be weighed is to use the liquid in the solids-in-liquid slurry itself. Sufficient amounts of this liquid may readily be obtained by decantation, filtration, or other convenient methods. Where water is the liquid in the solids-in-liquid slurry, then water will generally most conveniently be the liquid in which the solids are weighed.

Alternatively, it is possible to prepare a synthetic liquid mixture in which to weigh the solids, which liquid has the same specific gravity as the liquid in the solids-in-liquid slurry. Salt solutions, mixtures of organic liquids, or any combinations thereof may be used so long as the specific gravity is substantially identical to that of the liquid in the solids-in-liquid slurry. Should a synthetic liquid be used as the medium in which to weigh the solids, the synthetic liquid should be inert as to solubility and reactability in regard to the solids. Use of a synthetic liquid may minimize the effect of dissolved gasses in certain applications.

The wet weight of the solids may be determined by any convenient means. A gravimetric device such as a scale or balance will be used. The weighing pan for the solids will be adapted to retain the solids in the pan while the solids are immersed in the liquid in which the wet weight is being determined. The liquid itself may be contained in any convenient container which allows the weighing pan to dip beneath the surface of the liquid. The gravimetric device should be calibrated to account for the weight of the empty weighing pan while immersed in the liquid.

A representative sample of the slurry is removed and its weight is determined. The wet solids in the representative sample are then transferred to the weighing pan. Generally speaking, this is most readily accomplished simply by pouring the representative sample into the weighing pan. The solids will be retained in the pan while the liquid will merge with the liquid in the container. The wet weight of the solids may then be readily determined by measuring the increased weight in the weighing pan. The gravimetric device may be a beam-type balance, a spring scale, or any other device capable of yielding the weight of a material.

The following examples illustrate several embodiments of the invention.

EXAMPLE I

The pans were removed from an overhead-beam type of balance. The beam was calibrated to 0.1 gm. and, under final test conditions, was found sensitive to an estimated 0.025 gm. An open topped, stainless steel wire (100 mesh) box, about 4″ square and 2″ deep, was suspended from the left-hand pan hanger by means of wire and completely immersed in a three-gallon bucket of water. A plastic cup was suspended from the right-hand pan hanger and the whole arrangement balanced with lead shot.

The specific gravity of cellulose fibers under ambient conditions was determined to be 1.61. Slurries of various cellulose fibers were prepared wherein the amount of fibers and the amount of water were carefully weighed. The weighed slurry samples were deaerated by a two-minute exposure to a vacuum of 0.2–0.3 mm. Hg. Ten cc. anhydrous ethyl ether was added to the water in the bucket with gentle agitation.

The weighed slurry samples were then gently poured into the mesh-bottom, stainless steel box, and the wet weight of the fibers was determined. Knowing the weight of the representative sample and the wet weight of the fibers in said sample, the consistency was readily determined by means of Equation 4. The fibers were then transferred from the wire basket to a Büchner funnel, filtered, dried, and weighed as a gravimetric check. Following are the results:

*Cellulose fibers*

$$\text{Conversion factor} = \frac{\text{sp. gr.}}{\text{sp. gr.} - 1} = \frac{1.61}{.61} = 2.64$$

BLEACHED COTTON LINTERS—CANADIAN FREENESS 710 CC.

| Slurry Wt., gms. | Wet Fiber Wt., gms. | Calc. Const., percent | Dry Fiber Wt., gms. | Gravimetric Const., percent |
|---|---|---|---|---|
| 176.5 | 1.80 | 2.69 | 4.84 | 2.72 |
| 243.2 | 2.58 | 2.80 | 6.81 | 2.80 |
| 136.2 | 1.68 | 3.26 | 4.44 | 3.26 |

| BLEACHED COTTON LINTERS—CANADIAN FREENESS 330 CC. | | | | |
|---|---|---|---|---|
| 142.9 | 1.38 | 2.55 | 3.66 | 2.56 |

| UNBLEACHED KRAFT—CANADIAN FREENESS 550 CC. | | | | |
|---|---|---|---|---|
| 172.4 | 1.70 | 2.60 | 4.41 | 2.55 |
| 156.9 | 1.60 | 2.69 | 4.25 | 2.71 |
| 130.8 | 1.33 | 2.68 | 3.58 | 2.74 |

| BLEACHED SULFITE—CANADIAN FREENESS 530 CC. | | | | |
|---|---|---|---|---|
| 158.2 | 1.70 | 2.84 | 4.51 | 2.85 |
| 141.3 | 1.50 | 2.80 | 3.89 | 2.75 |
| 140.6 | 1.55 | 2.91 | 4.00 | 2.85 |

EXAMPLE II

Slurries were formed of asbestos fibers in the same manner as were the slurries of cellulose fibers in Example I. The specific gravity of asbestos fibers under ambient conditions was determined to be 2.56. Wet weight determinations were made as in Example I. Following are the results:

*Asbestos fibers*

$$\text{Conversion factor} = \frac{\text{sp. gr.}}{\text{sp. gr.} - 1} = \frac{2.56}{1.56} = 1.64$$

NORMANDIE 5-D—REFINED IN LABORATORY BEATER

| Slurry Wt., gms. | Wet Fiber Wt., gms. | Calc. Const., percent | Dry Fiber Wt., gms. | Gravimetric Const., percent |
|---|---|---|---|---|
| 145.5 | 3.53 | 3.98 | 5.85 | 4.02 |
| 170.2 | 4.18 | 4.03 | 6.79 | 3.93 |
| 154.5 | 3.73 | 3.96 | 6.15 | 3.98 |
| 161.1 | 4.03 | 4.10 | 6.67 | 4.14 |

| JOHNS-MANVILLE 5-D—REFINED IN LABORATORY BEATER | | | | |
|---|---|---|---|---|
| 157.8 | 3.70 | 3.85 | 6.03 | 3.82 |
| 146.0 | 3.43 | 3.86 | 5.63 | 3.86 |

EXAMPLE III

Runs were made as in Examples I and II except that the weighed slurry sample was not subjected to a vacuum. Instead 3 cc. anhydrous ethyl ether was added to the weighed slurry sample and the sample was stirred vigorously by hand for two minutes. Following are the results:

*Deaeration of slurry with anhydrous ether*

BLEACHED COTTON LINTERS—CANADIAN FREENESS 330 CC.

| Slurry Wt., gms. | Wet Fiber Wt., gms. | Calc. Const., percent | Dry Fiber Wt., gms. | Gravimetric Const., percent |
|---|---|---|---|---|
| 138.1 | 1.50 | 2.86 | 3.96 | 2.86 |
| 129.9 | 1.35 | 2.74 | 3.77 | 2.90 |

VIMY H 5-D ASBESTOS—REFINED IN LABORATORY BEATER

| | | | | |
|---|---|---|---|---|
| 143.2 | 4.00 | 4.58 | 6.84 | 4.78 |
| 143.3 | 4.35 | 4.98 | 7.13 | 4.98 |

I claim:
1. The method of determining the consistency of an aqueous slurry of papermaking fibers which comprises deaerating a representative sample of said slurry, weighing said deaerated sample, weighing the fibers in said sample while maintaining the water in which said fibers are immersed in a deaerated condition, and determining the consistency by means of the relationship

$$\text{Consistency} = \frac{\frac{S}{S-1} \times W}{T} \times 100$$

wherein
$S$ = specific gravity of the fibers,
$W$ = weight of fibers while immersed in water, and
$T$ = total weight of representative sample.

2. The method according to claim 1 wherein said representative sample is deaerated by subjecting said sample to a vacuum.

3. The method according to claim 1 wherein said steps of deaeration are carried out by the addition of a scavenging agent to remove dissolved gases.

4. The method according to claim 3 wherein said scavenging agent is ethyl ether.

References Cited in the file of this patent

UNITED STATES PATENTS

| 1,989,003 | Dunagen | Jan. 22, 1935 |
| 2,304,875 | Barnhart | Dec. 15, 1942 |

FOREIGN PATENTS

| 1,118,636 | France | Mar. 19, 1956 |